United States Patent [19]
Fischer

[11] 4,097,355
[45] Jun. 27, 1978

[54] WATER STERILIZATION APPARATUS

[75] Inventor: Wolfgang Fischer, Konigsburg, Germany

[73] Assignee: Sachs Systemtechnik, Schweinfurt am Main, Germany

[21] Appl. No.: 804,559

[22] Filed: Jun. 8, 1977

[30] Foreign Application Priority Data

Jun. 14, 1976 Germany ............................ 2626570

[51] Int. Cl.² .................... C02B 1/82; C25B 15/00
[52] U.S. Cl. .................................... 204/228; 204/149
[58] Field of Search ................ 204/228, 229, 149; 323/4, 200; 361/86, 91

[56] References Cited

U.S. PATENT DOCUMENTS

| | | | |
|---|---|---|---|
| 3,095,365 | 6/1963 | Green | 204/229 |
| 3,479,256 | 11/1969 | Smith et al. | 204/195 C |
| 3,566,246 | 2/1971 | Seer, Jr. | 323/4 X |
| 3,796,919 | 3/1974 | Johnson | 323/4 X |
| 3,813,666 | 4/1974 | Gately | 323/20 |
| 3,865,710 | 2/1975 | Phipps | 204/228 |
| 3,933,606 | 1/1976 | Harms | 204/149 X |

*Primary Examiner*—John H. Mack
*Assistant Examiner*—D. R. Valentine
*Attorney, Agent, or Firm*—Hans Berman

[57] ABSTRACT

The electrodes of a water purification cell are immersed in the water to be sterilized. The current through the cell is kept constant by varying the resistance of an emitter-collector circuit of a transistor connected in series with the cell to compensate for changes in the cell's internal resistance. The voltage across the cell is monitored by two threshold circuits to determine if the conductivity of the water is within an allowable conductivity range. If the conductivity falls outside the range, a light-emitting diode is energized. The light-emitting diode is also energized if the voltage of the battery supplying the power for the cell falls below a given value. If no water is present in the supply line to the cell, a switching transistor is blocked, thereby disconnecting most of the equipment from one side of the battery.

12 Claims, 1 Drawing Figure

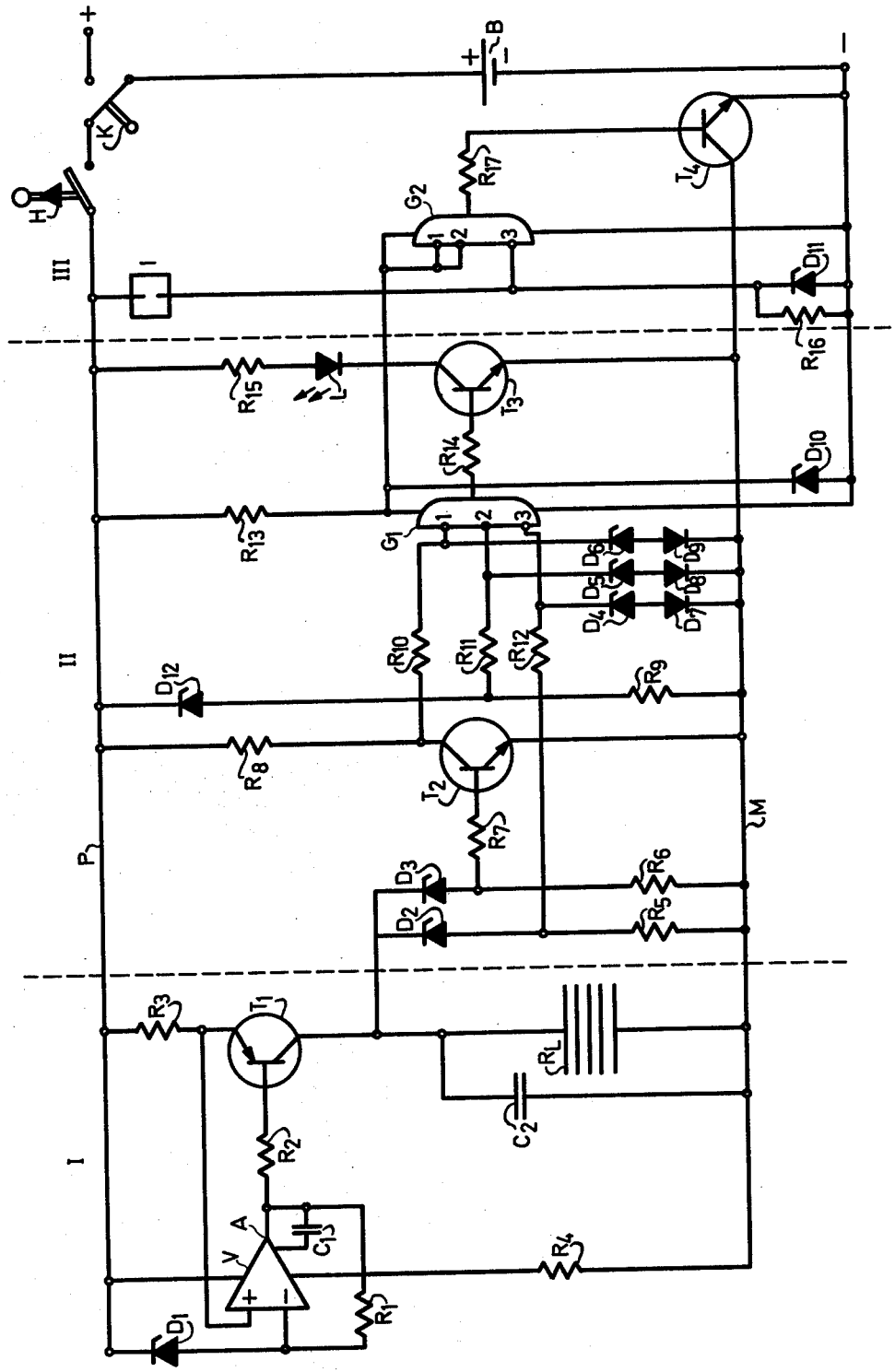

WATER STERILIZATION APPARATUS

BACKGROUND OF THE INVENTION

This invention relates to water sterilization equipment. It is particularly appropriate when the power source for the purification cell is a battery.

It is known that oxidation at the anode of a cell may be used for sterilization of water. Water purification cells of this type have a plurality of electrodes which are spaced apart and insulated from each other and immersed in the water to be purified. If a direct voltage is applied to the electrodes, a direct current flows between the electrodes. However, for effective sterilization, it is necessary that both the current through the cell and the voltage across the cell be maintained above certain minimum values. For direct energization by the battery or for energization through fixed resistors only, the current through the cell would vary in correspondene to the conductivity of the water. For high water conductivities, if is therefore possible that the batteries would be overloaded and that the voltage across the cell would decrease to such an extent that proper sterilization could no longer take place. On the other hand, for low conductivities, it is possible that the current through the cell would decrease sufficiently that the bacteria present in the water would not be killed.

SUMMARY OF THE INVENTION

It is an object of the present invention to furnish water sterilization apparatus which maintains optimum sterilization conditions despite changes of conductivity of the water passing through the water purification cell. Further, the apparatus is to have an indicator which automatically furnishes an indication if the proper sterilization conditions can no longer be maintained.

The present invention provides water sterilization apparatus which comprises a water purification cell having a plurality of electrodes immersed in the water to be purified. It further comprises a constant current source connected to the cell. The constant current source comprises a source of DC voltage and a series circuit including the cell, the emitter-collector circuit of a transistor, and a fixed resistor connected across the source. The voltage drop across the fixed resistor is applied to one input of a difference amplifier whose other input receives a reference voltage. The output of the difference amplifier is connected to the base of the transistor and a feedback resistor is provided between the output and the inverting input of the difference amplifier. The difference amplifier operates to adjust the resistance of the emitter-collector circuit of the transistor in a direction keeping the voltage drop across the fixed resistor constant. The current through the cell therefore remains constant over a wide range of water conductivity. This results in a more uniform sterilization and protects the battery from overloads.

For very high values of internal resistance of the water purification cell which result from very low conductivities or upon a break in the electrical line leading to the cell, the transistor may saturate, that is, become ineffective in carrying out its control function. Further, for very high conductivities the transistor may block. The present invention therefore also provides an indicator to indicate when the voltage across the cell is less than or greater than, respectively, a given minimum and maximum amplitude. Preferably, the indicator is a light-emitting diode which furnishes a green light when the water conductivity is within the prescribed range.

The indicator can also be utilized to furnish a signal when the battery voltage drops below a predetermined minimum value.

To prevent unnecessary loading of the battery if no water is present in the cell, the circuit from the cell to one side of the battery is completed only when a switching transistor is in the conductive state. The switching transistor is switched to the conductive state only when the voltage across a sensor drops because of water between the sensor electrodes. The sensor is placed in the water supply line to the cell.

Other features, additional objects, and many of the attendant advantages of this invention will readily be appreciated as the same becomes better understood by reference to the following detailed description of preferred embodiments when considered in connection with the appended drawing.

BRIEF DESCRIPTION OF THE DRAWING

The only FIGURE is a schematic diagram of a preferred embodiment of the present invention.

DESCRIPTION OF THE PREFERRED EMBODIMENT

In the Figure, the water purification cell $R_L$ sterilizes and purifies water passing between its electrodes by oxidation at the anode. The circuit includes a positive line P and a ground line M. Line P is connected through the main stwitch H and two contacts of a selection switch K to the positive side of a battery B. In the other position of selector switch K, the line P is connected to a power supply. The cathode of battery B is not directly connected to ground potential. For easier understanding, the circuit may be divided into three building blocks, I, II, III, which will be discussed separately below.

Unit I contains the cell $R_L$ and the circuit for maintaining the current through the cell constant. The electrodes of cell $R_L$ may each be either a single plate or a group of plates. One electrode of cell $R_L$ is connected to ground potential, while the other is connected to the collector of a transistor $T_1$ whose emitter is connected through a fixed resistor $R_3$ to the positive supply line P. Resistor $R_3$, emitter-collector circuit of transistor $T_1$ and cell $R_L$ together constitute a voltage divider. Resistor $R_3$ is a fixed resistor, while the resistance of both the cell and the emitter-collector circuit of transistor $T_1$ are variable. The base voltage of transistor $T_1$ is controlled by the output of a difference amplifier V. The direct input of difference amplifier V is connected to the emitter of transistor $T_1$ while the inverting input is connected to a constant voltage source, i.e. it receives a reference signal. The constant voltage source comprises a Zener diode $D_1$ which is operated in the blocked state. A feedback resistor $R_1$ is connected from the output to the inverting input of difference amplifier V. It serves to linearize the transfer characteristic of difference amplifier V. A base current limiting resistor $R_2$ is connected between the output of amplifier V and the base of transistor $T_1$. A capacitor $C_1$ in conjunction with resistor $R_1$ serves to prevent oscillations in difference amplifier V. For energization, difference amplifier V is directly connected to the positive supply line and is connected to ground potential through a resistor $R_4$. Resistor $R_4$ also acts as a negative current feedback when transistor $T_1$ saturates. Capacitor $C_2$, connected in parallel with cell $R_L$, serves to suppress noise voltages and voltage spikes. Unit I operates as follows:

If water flows through cell $R_L$, a current flows from line P through resistor $R_3$, the emitter-collector circuit of transistor $T_1$ and cell $R_L$ to ground potential. The current required for proper sterilization depends upon the size of the cell, the distance between its electrodes, etc. and can be determined in known manner. The voltage drop across resistor $R_3$ for this current is determined and the Zener diode $D_1$ is selected to correspond to this drop. Difference amplifier V compares the voltage across diode $D_1$ to the drop across resistor $R_3$ and, if a difference is present, controls the internal resistance of the emitter-collector circuit of transistor $T_1$ until the difference becomes zero. The current through cell $R_L$ therefor remains substantially constant. The gain of difference amplifier V is reduced by resistor $R_1$ sufficiently that a linear characteristic is obtained over the given range of water conductivities. If the internal resistance of the cell becomes too high, that is, if the water flowing therethrough is either chemically very pure and therefore has a low conductivity, or if a line to the cell breaks, the difference amplifier furnishes a base voltage to transistor $T_1$ which causes it to saturate. In this case, a very high battery current flows from line P through resistor $R_3$, the emitter-base circuit of transistor $T_1$, resistor $R_2$, and amplifier V to ground. Resistor $R_4$, however, serves to limit the current flowing through the amplifier to a maximum safe value.

Unit II contains the circuitry for furnishing a visual indication when the equipment is ready for operation. The following operating conditions are monitored:

1. The conductivity of the water to be purified is too high. This excludes water which is so strongly contaminated by salts that it is to be excluded from the purification process.
2. The conductivity of the water to be purified is too low. This is to exclude the possibility that the water is not properly sterilized because the current through the cell is too low.
3. The battery voltage is too low.

The conductivity of the water is monitored by monitoring the voltage across the cell $R_L$. For a constant current through the cell, the voltage across it will of course be a function of the conductivity. Two threshold circuits, one containing a Zener diode $D_2$ and a resistor $R_5$, the other containing a Zener diode $D_3$ and a resistor $R_6$, are connected in parallel with the cell for this purpose. The indicator is a light-emitting diode L which is connected through a resistor $R_{15}$ to line P and through the emitter-collector circuit of a transistor $T_3$ to ground potential. The conductivity state of transistor $T_3$ and therefore the energization of diode L are controlled by the output of a gate $G_1$. Gate $G_1$ is an AND gate whose output is connected through a resistor $R_{14}$ to the base of transistor $T_3$. As long as the conductivity of the water is in the prescribed range and the battery voltage above a given minimum value, AND gate $G_1$ furnishes an output which causes transistor $T_3$ to conduct, thereby energizing diode L. Diode L may then furnish a green light which indicates that the whole system is in proper operating condition. Of course, the circuit could equally well be arranged so that diode L extinguishes under proper operating conditions and furnishes a red light to indicate improper operating conditions.

Zener diode $D_2$ is used to monitor the upper permissible conductivity value in the water to be purified. If the conductivity increases above this value, Zener diode $D_2$ blocks, the voltage at the third input of gate $G_1$ goes to ground potential and no output is furnished by gate $G_1$, thereby causing transistor $T_3$ to block. Diode L is deenergized. The lower conductivity limit is monitored by means of Zener diode $D_3$. As the voltage across cell $R_L$ increases beyond a prescribed value, Zener diode $D_3$ breaks down, causing transistor $T_2$ to become conductive. The emitter of transistor $T_2$ is directly connected to ground potential, while its collector is connected through a resistor $R_8$ to the positive line. The resistance of resistor $R_8$ is high relative to the resistance of collector-emitter circuit of transistor $T_2$ when the latter is fully conductive. Under these conditions, the input of AND gate $G_1$ is connected substantially to ground potential and AND gate $G_1$ blocks. Transistor $T_3$ becomes non-conductive and diode L is again extinguished.

The battery voltage is monitored by a series circuit comprising a Zener diode $D_{12}$ and a resistor $R_9$ connected between the positive line and ground potential. The common point of Zener diode $D_{12}$ and resistor $R_9$ is connected through a resistor $R_{11}$ to the second input of AND gate $G_1$. When the voltage across diode $D_{12}$ sinks below the minimum battery voltage, diode $D_{12}$ blocks, input 2 of AND gate $G_1$ receives a logic "O" signal, AND gate $G_1$ blocks, and diode L is again deenergized.

Zener diodes $D_4$, $D_5$ and $D_6$ are connected between the third, second and first inputs of AND gate $G_1$ and ground. It is the purpose of these diodes to protect the AND gate from excessively high input voltages. Resistors $R_{10}$, $R_{11}$ and $R_{12}$ serves as current limiting resistors. Connected between Zener diodes $D_4$, $D_5$ and $D_6$ and ground potential are, respectively, diodes $D_7$, $D_8$ and $D_9$, but with opposite polarity. The reason for these diodes will be explained in detail in connection with the operation of unit III.

Unit III contains the voltage source for the apparatus as well as a load disconnect for energy conservation. The cathode of battery B is not directly connected to the ground line of the rest of the apparatus. Rather, it is connected to the emitter of a switching transistor $T_4$ whose collector is connected to the ground line. When transistor $T_4$ blocks, there is therefore no connection between the negative side of the battery and ground and those circuits whose current return is through the ground line are therefore deenergized. The circuit for disconnecting the cathode of battery B from the ground line comprise in the main a sensor 1 which is positioned in the inlet line of water to the cell $R_L$. Specifically, it contains two electrodes. If water is present in the inlet, the internal resistance of sensor 1 drops sharply. Since indicator 1 is connected in series with the parallel combination of a resistor $R_{16}$ and a Zener diode $D_{11}$, a voltage divider circuit is formed which causes the voltage at the common point of sensor 1 and resistor $R_{16}$ to increase sharply when the internal resistance of the sensor drops. This increase in voltage is transmitted through an AND gate $G_2$ to the base of transistor $T_4$ which then becomes conductive, causing the remainder of the apparatus to be energized. It will be noted that AND gate $G_2$ is supplied with voltage from the positive line through a resistor $R_{13}$ and from the negative side of the battery by a direct connection. AND gate $G_2$ is thus energized independently of the switching state of transistor $T_4$. Diode $D_{11}$ limits the maximum voltage applied to the input of AND gate $G_2$. Zener diode $D_{10}$ in conjunction with resistor $R_{13}$ serves to stabilize the supply voltage for AND gates $G_1$ and $G_2$. The above-mentioned diodes $D_7$, $D_8$ and $D_9$ protect the inputs of AND gate $G_1$ if transistor $T_4$ does not become fully conductive. In this case, the voltage difference existing between ground potential and the negative side of battery B would, in the absence of diodes $D_7 - D_8$, cause AND gate $G_1$ to become conductive. However when diodes $D_7 - D_8$ are blocked, the potential at the ground line cannot be applied to the inputs of AND gate $G_1$.

The range of water conductivity for proper operation of the circuit is approximately 100 uS to 2,000 uS. The circuit of sensor 1 responds to conductivities exceeding approximately 100 uS.

While the invention has been illustrated in several preferred embodiments, it is not to be limited to circuits and structures shown, thus many variations thereof will be evident to one skilled in the art now intended to be encompassed in the present invention as set forth in the following claims.

What is claimed is:

1. Water sterilization apparatus, comprising in combination, a water purification cell having an internal resistance varying as a function of the conductivity of water passing therethrough, said purification cell being effective only when the voltage thereacross has an amplitude in a range between a predetermined minimum amplitude and a predetermined maximum amplitude and requiring a substantially constant current for proper sterilization of said water; a constant current source connected to said water purification cell for furnishing said constant current; and monitoring means for monitoring the voltage across said water purification cell and furnishing a fault signal when said voltage is outside said range.

2. Apparatus as set forth in claim 1, wherein said monitoring means comprises a threshold circuit for furnishing a threshold output signal when said voltage across said water purification cell exceeds said predetermined maximum amplitude or is less than said predetermined minimum amplitude, and indicator means for furnishing a visual indication of said threshold output signal.

3. Apparatus as set forth in claim 2, wherein said threshold circuit means comprises a first and second series circuit each connected in parallel with said water purification cell, each comprising a Zener diode and a resistor connected to said Zener diode at a common point, and gating means having a first input connected to said common point of said first series circuit, a second input and a gating output, and an inverter connected between said second common point of said second series circuit and said second input of said gating means; and wherein said indicator means comprises a light-emitting diode, an indicator transistor having an emitter-collector circuit connected in series with said light-emitting diode and a base, and means for connecting said base to said gating output of said gating means.

4. Water sterilization apparatus comprising:
(a) a cell adapted to hold the water to be purified;
(b) two electrodes spacedly arranged in said cell for contact with said water;
(c) constant current supply means connected to said electrodes for passing a constant current between said electrodes through said water; and
(d) monitoring means for monitoring the voltage across said electrodes and for furnishing a fault signal when the monitored voltage is outside a predetermined range.

5. Apparatus as set forth in claim 4, wherein said constant current supply means comprises a source of DC voltage, controllable resistance means interconnected between said electrodes and said source of DC voltage, and means for changing the resistance of said controllable resistance means to compensate for changes in the internal resistance of said water purification cell, thereby maintaining a constant current through said cell.

6. Apparatus as set forth in claim 5, wherein said controllable resistance means comprises the emitter-collector circuit of a transistor, said transistor further having a base, means for furnishing a control signal having an amplitude varying as a function of the amplitude of current through said emitter-collector circuit, and means for applying said control signal to said base of said transistor.

7. Apparatus as set forth in claim 6, wherein said means for furnishing a control signal comprises a resistor connected in series with said emitter-collector circuit of said transistor, the voltage drop across said resistor constituting said control signal; and wherein said means for applying said control signal to said base of said transistor comprises means for furnishing a reference voltage, a difference amplifier having a direct input, an inverting input, and an output, and means for connecting said direct input to said resistor, said inverting input to said means for furnishing a reference signal and said output to said base of said transistor.

8. Apparatus as set forth in claim 7, further comprising a feedback resistor connected between said output of said difference amplifier and said inverting input.

9. Apparatus as set forth in claim 8, wherein said resistor has a first terminal connected to said emitter-collector circuit of said transistor and a second terminal; wherein said first terminal of said resistor is connected to said direct input of said difference amplifier; and wherein said means for furnishing a reference signal comprises a Zener diode connected from said second terminal of said resistor to said inverting input of said difference amplifier.

10. Apparatus as set forth in claim 5, wherein said source of DC voltage is a battery having a positive and negative terminal; wherein said electrodes are series connected from said positive terminal to ground potential; further comprising means for connecting said negative terminal of said battery to ground potential only when water is flowing through said water purification cell.

11. Apparatus as set forth in claim 10, wherein said means for connecting said negative terminal of said battery to ground potential comprises the emitter-collector circuit of a switching transistor, said switching transistor further having a base, sensing means positioned in the intake of water to said purification cell for furnishing a switching signal only in the presence of water therein, and means for maintaining said switching transistor in the conductive state only in the presence of said switching signal.

12. Apparatus as set forth in claim 5, wherein said source of DC voltage is a battery; said monitoring means including means for furnishing a fault signal when the voltage across said battery is less than a predetermined minimum voltage.

* * * * *